(No Model.)
G. FOURNIER.
PRIMARY OR SECONDARY BATTERY.
No. 316,533. Patented Apr. 28, 1885.
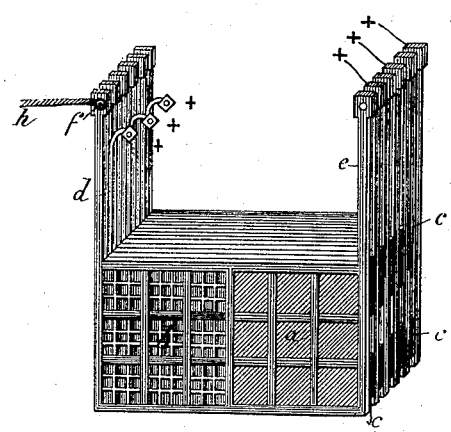
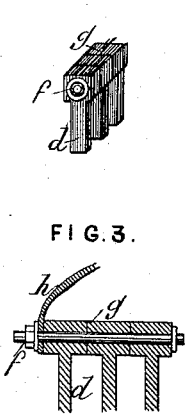
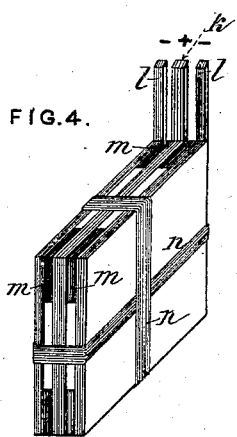
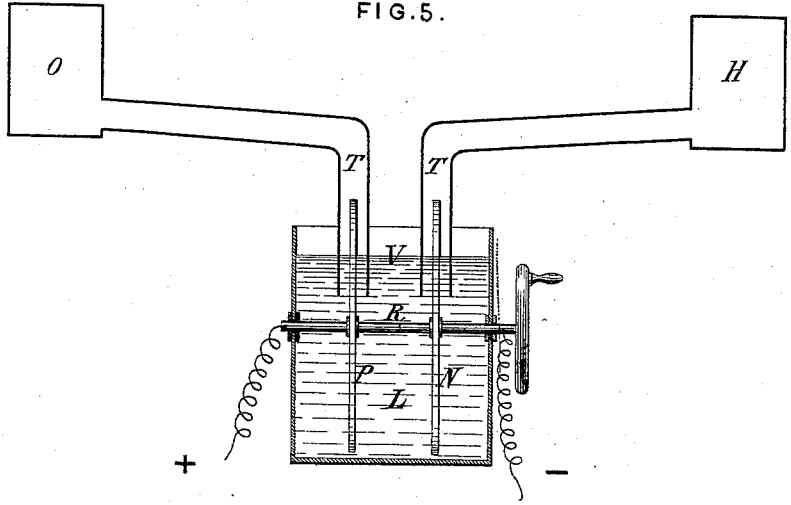
Witnesses:
John C. Tunbridge
Gustav Schneppé
Inventor
George Fournier
by his attorneys
Briesen & Betts

UNITED STATES PATENT OFFICE.

GEORGE FOURNIER, OF PARIS, FRANCE.

PRIMARY AND SECONDARY BATTERY.

SPECIFICATION forming part of Letters Patent No. 316,533, dated April 28, 1885.

Application filed August 23, 1884. (No model.) Patented in France August 23, 1881, No. 144,499; in Belgium November 9, 1881, No. 56,179, and in England November 22, 1881, No. 5,104.

*To all whom it may concern:*

Be it known that I, GEORGE FOURNIER, of Paris, France, merchant, have invented Improvements in Primary and Secondary Batteries; and I do hereby declare that the following is a full, clear, and exact description of the same, and that for said invention I have received the following Letters Patent: Letters Patent of France, for fifteen years, No. 144,499, dated August 23, 1881; Letters Patent of Belgium, No. 56,179, dated November 9, 1881, for fifteen years, and Letters Patent of Great Britain, for fourteen years, No. 5,104, dated November 22, 1881.

This invention consists, essentially, in the employment in primary and secondary batteries of a mixture of glycerine or glyceric acid and of metallic oxides capable of forming therewith a solid compound insoluble in water.

In carrying out this invention I take lead oxide, for example, (which of all the metallic oxides is best adapted for the purposes of this invention,) in powder, and mix it with glycerine in sufficient quantity to form a thick paste sufficiently fluid to be run into molds. In about twenty-four hours after being thus cast in molds of suitable form the mixture sets in a solid mass, which is insoluble in water. This compound is exceedingly reducible, so much so that when immersed in dilute sulphuric acid, together and in circuit with metallic zinc, it becomes reduced to metallic lead as fast as the zinc is attacked. It is therefore eminently suited for use in galvanic batteries, as it would prevent galvanic polarization, and it may either wholly replace carbon or be applied in layers upon carbon or other conductor of electricity. Being such an excellent depolarizing agent, it enables one to obtain a constant single-fluid battery.

As above mentioned, the compound becomes completely reduced, and therefore in the present example we have metallic lead as the product of this reduction, which, being in a complete state of division, will be very readily re-oxidized for use again as a depolarizing agent, or even become peroxidized, and may therefore be employed with advantage in the construction of secondary batteries. I may also prepare secondary batteries by the direct peroxidation of plates composed of or prepared with a compound of lead oxide and glycerine, as above described, without the intermediate reduction of the lead to the metallic state.

I have stated that the oxide of lead is the one best suited to form the plastic mass with glycerine; but I may, without departing from this invention, add thereto other matters still better adapted to oppose polarization of the electrode—such as the peroxides of lead, manganese, &c. These, although not capable alone of combining with glycerine, are nevertheless susceptible of being agglomerated (when mixed in suitable proportions) with lead oxide and glycerine, which form therewith a solid mass in the same way as does plaster, with which inert bodies—such as sand or metallic powder—have been mixed before setting. The addition of peroxides confers greater depolarizing properties, as the compound then contains, weight for weight, a higher proportion of oxygen, besides which the peroxides being better conductors of electricity than the oxides, the internal resistance of the battery is notably reduced and its power correspondingly increased. This quality of conductibility consequently enables the portions of the mixture not already peroxidized to be more easily peroxidized by the passage of the electric current, and permits of the production of plates of any desired thickness wholly composed of lead peroxide, and very suitable for use either in primary or secondary batteries, as hereinafter referred to.

In the accompanying drawings, Figure 1 represents a perspective view of a group of several plates which constitute an element of the secondary battery. Figs. 2 and 3 are detail views showing the arrangement of the conductors. Fig. 4 shows the arrangement of parts for the primary battery. Fig. 5 is a sectional elevation of a battery containing a modification of my invention.

In Fig. 1, *a* represents a frame or mold filled with the mixture of metallic oxide and glycerine. *b* is a conducting-mold. The several molds are separated from one another by insulating-plates *c*. The several molds have upwardly-extending posts *d e*, which reach above the liquid in the battery. Figs. 2 and 3 show how the posts on each side are enlarged, as at g, and connected by a rod, f. The conductor h is secured to one of the end posts, d. On one side are assembled the positive electrodes, while the negative are turned aside or cut off. The reverse takes place on the other side. By this means all the electrodes of the same name are on one side, and all those of the opposite name on the other—i. e., negative and positive.

In Fig. 4, which represents an element of the primary battery, is found at the middle a conducting-frame, k, similar to one of the frames described for the secondary battery. At its sides are zinc plates l l, which constitute the negative electrode. The plates l k l are separate from one another by insulating plates m, and the whole is bound together by caoutchouc bands n.

I may, without departing from my invention, employ a mixture, in the proportions indicated by their chemical equivalents, of an oxide insoluble, and of a metal which can be attached in the same liquid—such as a mixture of litharge, glycerine, and zinc filings. On plunging such a plate into diluted sulphuric acid a solid but porous metallic plate of lead will after a short while be produced.

The plates, whatever their number, may be placed in suitable manner. For example, they may be arranged as in Fig. 5 to be rotated. In said Fig. 5 is a glass vessel containing a solution of diluted sulphuric acid.

R is a shaft hung therein. P are the positive and N the negative plates. By turning the shaft the plates are successively brought in contact with the conducting-liquid L, and by a tube, T, with the oxygen-reservoir O for the positive plate, and by another such tube with the hydrogen-reservoir H for the negative plate.

Let us consider, first, the action of a primary battery in which a plate composed of glycerine, lead oxide, and lead peroxide agglomerated, as above mentioned, and plunged in a dilute solution of sulphuric acid contained in a cell, forms the negative plate or element, and a copper plate of suitable thickness forms the positive plate or element. When the circuit is closed, the sulphuric acid attacks the copper plate, forming sulphate of copper and disengaging hydrogen, which pass to the plate composed of glycerine, lead oxide, and peroxide. This plate would soon be covered and polarized were the hydrogen not in contact with a matter capable of very readily oxidizing it. No polarization will therefore take place, and the battery will act with uniform constancy so long as the acid acts on the copper plate and there remains in the compound plate any oxygen to oxidize the hydrogen thereby disengaged.

A battery thus composed is, so to speak, of indefinite duration, as it may be readily reconstituted or reconverted into its primitive elements by the passage of an electric current. Suppose that the whole of the sulphuric acid has combined with the copper and formed sulphate of copper, and the hydrogen thereby disengaged has combined with the whole of the oxygen of the compound plate of lead oxide, lead peroxide, and glycerine, there will remain in the battery only the plate of copper partially attacked, sulphate of copper, and the plate of reduced lead. If, now, an electric current be passed through the battery in the proper way, the sulphate of copper will be decomposed, copper will be deposited on the copper plate, the oxygen of the decomposed sulphate of copper will combine with the reduced lead plate and reoxidize it, the sulphuric acid will be set free again, and the battery will then be reconstituted and ready for further action.

It should be understood that I have merely instanced copper and sulphuric acid by way of example, as other metals and acids will give the same result.

In the case of secondary batteries the compound plate of oxide, peroxide, and glycerine is immersed in a dilute sulphuric-acid solution in presence either of a sheet of lead, or, better still, a plate composed of lead oxide, metallic lead in powder, and glycerine. A current passed through this battery under proper conditions will decompose the water, the oxygen combining with the plate of oxide, peroxide, and glycerine, completely peroxidizing it, and the hydrogen passing to the other plate. Thus we have the elements of a Planté accumulator, with the difference that the substances employed are in a condition more favorable for oxidation and reduction than sheet-lead.

I claim—

1. An element for primary and secondary batteries, formed of a paste composed of a mixture of glycerine or glyceric acid and one or more metallic oxides capable of setting when mixed therewith, the said mixture being molded into any suitable form or applied to pieces of carbon or other conducting substance, substantially as and for the purpose above specified.

2. An element for primary and secondary batteries, composed of a plastic mixture of oxide of lead and glycerine, molded of any desired form, substantially as and for the purpose specified.

3. An element for primary and secondary batteries, formed of a plastic mixture which is composed of glycerine, lead oxide, peroxides of lead, and manganese, substantially as above described.

4. A single fluid primary battery formed by the combination of a metallic element and of an element consisting of glycerine and lead oxide, substantially as described, and for the purpose specified.

GEORGE FOURNIER.

Witnesses:
EDWARD P. MACLEAN,
JEAN BAPTISTE ROLLAND.